J. E. DOWNS & G. D. McNAMES.
HORSESHOE.
APPLICATION FILED FEB. 12, 1912.
1,050,526.
Patented Jan. 14, 1913.
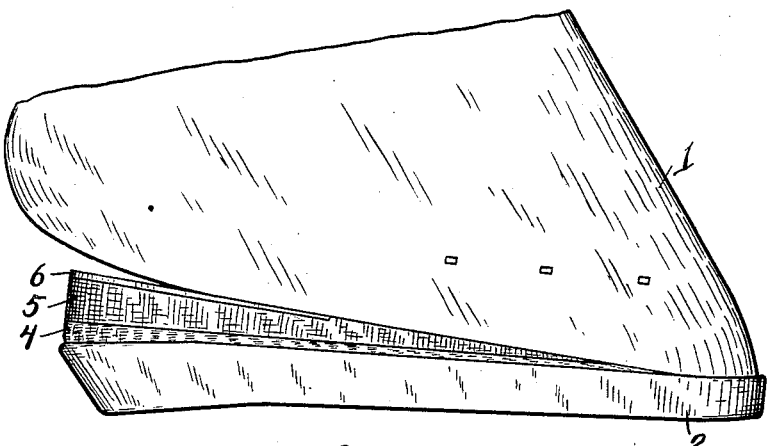
Fig. I.
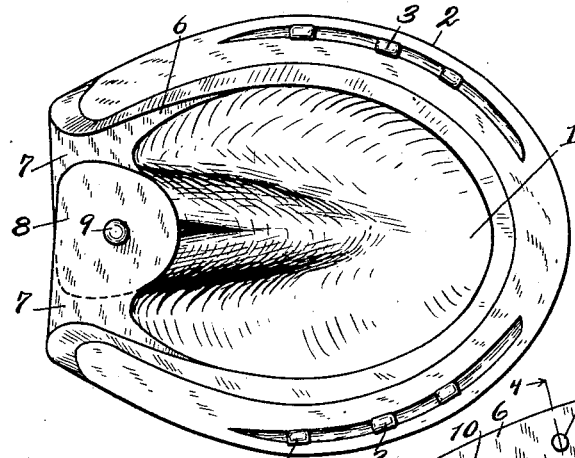
Fig. II.
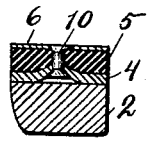
Fig. IV.
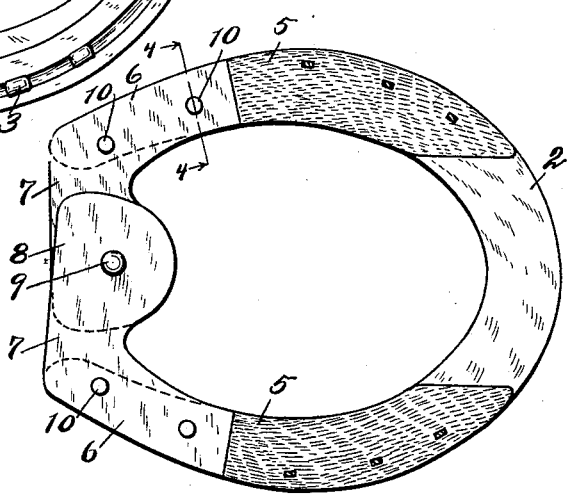
Fig. III.
Witnesses
Margaret L. Glasgow.
Luella Greenfield
Inventors
Joseph E. Downs
George D. McNames
By Chappell Earl
Attorneys

UNITED STATES PATENT OFFICE.

JOSEPH E. DOWNS AND GEORGE D. McNAMES, OF BATTLE CREEK, MICHIGAN.

HORSESHOE.

1,050,526.  Specification of Letters Patent.   Patented Jan. 14, 1913.

Application filed February 12, 1912.  Serial No. 676,932.

*To all whom it may concern:*

Be it known that we, JOSEPH E. DOWNS and GEORGE D. McNAMES, citizens of the United States, residing at Battle Creek, county of Calhoun, and State of Michigan, have invented certain new and useful Improvements in Horseshoes, of which the following is a specification.

This invention relates to improvements in horse shoes.

It relates particularly to improvements in heel cushion devices for horse shoes.

The main objects of the invention are to provide an improved cushion heel structure for horse shoes which is adjustable to different sizes of shoes and hoof conditions and which is advantageous for use on animals having diseased feet, such as contracted hoofs, quarter cracks, corns, etc.

Further objects, and objects relating to structural details, will definitely appear from the detailed description to follow.

We accomplish the objects of our invention by the devices and means described in the following specification.

The invention is clearly defined and pointed out in the claims.

A structure which is a preferred embodiment of our invention is clearly illustrated in the accompanying drawing, forming a part of this specification, in which:

Figure I is a detail side elevation of a horse hoof having a shoe thereon embodying the features of our invention. Fig. II is an inverted view of the same showing our improved shoe in position, no attempt being made to illustrate the frog of the hoof accurately. Fig. III is a plan view of the shoe detached, the nails being shown in section. Fig. IV is an enlarged transverse section taken on a line corresponding to line 4—4 of Fig. III, showing the details of construction.

In the drawing, similar reference characters refer to similar parts throughout the several views, and the sectional views are taken looking in the direction of the little arrows at the ends of the section lines.

Referring to the drawing, 1 represents the hoof of a horse.

The shoe 2 is of the so-called plate type,— that is, it is without calks. The shoe is secured by nails 3, as is the customary practice. Wedge-shaped cushions are disposed upon the shoe with the points forwardly. The cushions are preferably laminated, being formed of bottom layers 4 of leather and top layers 5 of rubber. A pair of spring plates 6 having inwardly projecting arms 7 are arranged on and supported by these cushions. The arms 7 terminate in forwardly projecting disk-like portions 8. The arms 7 are joined by vertically disposed rivets 9. The plates 6 are secured to the cushion by rivets 10, the heads of the rivets being countersunk in the cushions so that the cushions can compress without raising the rivets. The cushions are arranged on the heels of the shoe and extend well forward, the cushions being wedge-shaped and secured by means of the nails 3. In applying the shoe, it is fitted for setting as usual and the cushions are adjusted thereto, and to bring the spring cross member into the desired position and secured by the nails 3 in the customary manner.

By pivoting the plates together they may be adjusted to different sizes of shoes and to different conditions of the hoof. The plates 6 and their integrally formed arms 7 are formed of spring metal as suitable spring sheet metal, and are disposed to engage the frog of the hoof so as to yieldingly support the same and as the horse travels this works or acts upon the frog which is advantageous in such diseases as contracted hoofs. The weight upon the heel is relieved, which allows it to spread more effectively. This relieving of the weight upon the heel is also advantageous for quarter cracks, corns, and the like. The heels being supported by the cushions, are allowed to yield and expand so that our improved shoe is found very advantageous for different diseased conditions of the hoofs.

The frog is supported yieldingly as stated, without providing a full hoof pad. Such full hoof pads are objectionable in our pinion in that they are unsanitary and are likely to cause decay and disease. The cushion members being adjustable, can be effectively applied under such varying conditions as are likely to be met with in the shoeing of horses. Another advantage of the construction is, that it is inconspicuous and light in weight.

We have illustrated and described our improvements in a simple embodiment. Considerable structural variation is possible and desirable results still be attained. We have not attempted to illustrate or describe such variations as we believe the disclosure will enable the adaptation of our invention to various conditions and requirements.

Having thus described our invention, what we claim as new and desire to secure by Letters Patent is:

1. The combination with a horse shoe, of wedge-shaped cushions disposed above the heel thereof, and sheet metal plates disposed upon and carried by the cushions and provided with inwardly projecting disk portions overlapped and pivoted together and disposed to engage the frog, all coacting as specified.

2. The combination with a horse shoe, of cushions disposed above the heel thereof, and spring metal plates arranged on and carried by said cushions and having inwardly projecting arms, said arms being pivotally connected to permit adjustment beneath the frog, all coacting for the purpose specified.

3. The combination with a horse shoe, of cushions disposed above the heel thereof, and an adjustable spring bar extending between and carried by said cushions and yieldingly supported thereby, said bar being adjustable to engage the frog whereby the same is yieldingly supported.

4. The combination with a horse shoe, of a heel cushion structure, and sheet metal plates carried thereby and having inwardly and forwardly projecting disk portions pivoted together and disposed to extend beneath the frog, there being an open space between the cushions at the rear, whereby the structure is adjustable and the frog is yieldingly supported, as specified.

5. In a structure of the class described, the combination of a pair of wedge-shaped heel cushions, comprising bottom layers of leather and top layers of rubber; and sheet metal plates arranged on said cushions and having inwardly projecting arms terminating in disk-like portions overlapped and pivotally connected, said plates being riveted to said cushions and yieldingly supported thereby.

6. In a structure of the class described, the combination of a pair of heel cushions, and sheet metal plates arranged on and yieldingly supported by said cushions, said plates being secured to said cushions and having inwardly projecting pivotally connected arms.

In witness whereof, we have hereunto set our hands and seals in the presence of two witnesses.

JOSEPH E. DOWNS. [L. S.]
GEORGE D. McNAMES. [L. S.]

Witnesses:
FLORENCE McKINSEY,
B. D. FRENCH.

---

Copies of this patent may be obtained for five cents each, by addressing the "Commissioner of Patents, Washington, D. C."